June 23, 1970     D. V. HELLE     3,516,330

INCREMENTAL FEEDING APPARATUS

Filed Oct. 8, 1968     2 Sheets-Sheet 1

Delbert V. Helle
Inventor
Koenig, Senniger,
Powers and Leavitt,
Attorneys.

United States Patent Office 3,516,330
Patented June 23, 1970

3,516,330
INCREMENTAL FEEDING APPARATUS
Delbert V. Helle, Farmington, Ill., assignor to Sawmill Hydraulics, Inc., Farmington, Ill., a corporation of Illinois
Filed Oct. 8, 1968, Ser. No. 765,774
Int. Cl. F15b 11/16, 21/02
U.S. Cl. 91—36    12 Claims

ABSTRACT OF THE DISCLOSURE

An automatic setworks apparatus for repetitively advancing or feeding a workpiece in predetermined equal increments, comprising a pair of positive displacement hydraulic motors which are connected in series across a fluid pressure source. One of the motors advances the workpiece and the other controls the extent of operation, the operation of the second motor being directly proportional to the operation of the first by virtue of the series hydraulic connection.

BACKGROUND OF THE INVENTION

This invention relates to automatic incremental feed apparatus and more particularly to such apparatus which will automatically advance or feed a workpiece in accurately predetermined increments.

In sawmill operations, for example, it is desirable to make successive cuts in a log at uniform, accurately spaced intervals. Similar incremental feed operations are necessary in various other machine operations. In such operations it is highly desirable that the increments of feed or advancement be automatically and accurately determined.

SUMMARY OF THE INVENTION

Among the several objects of the present invention may be noted the provision of apparatus for automatically advancing a workpiece in predetermined increments; the provision of such apparatus in which the increments of advance are precisely predetermined and accurately reproducible; the provision of such apparatus which is highly reliable and durable; the provision of such apparatus which is smooth in operation; and the provision of such apparatus which is relatively simple and inexpensive.

Briefly, apparatus constructed according to the present invention comprises a first positive displacement hydraulic motor and means driven by that motor for advancing the workpiece. A second positive displacement hydraulic motor is interconnected with the first in a fluid circuit including valve means for selectively connecting the first and second motors with a fluid pressure source. Means is provided for selectively initiating a phase of operation in which the valve means is operated to connect the first and second hydraulic motors in series across the fluid pressure source for concurrent operation, the operation of the second motor being thereby directly proportional to the operation of the first. Means driven by the second motor operates to terminate the phase of operation when the operation of the second motor reaches a preselected limit. Accordingly, the workpiece is advanced by a precisely controlled increment.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
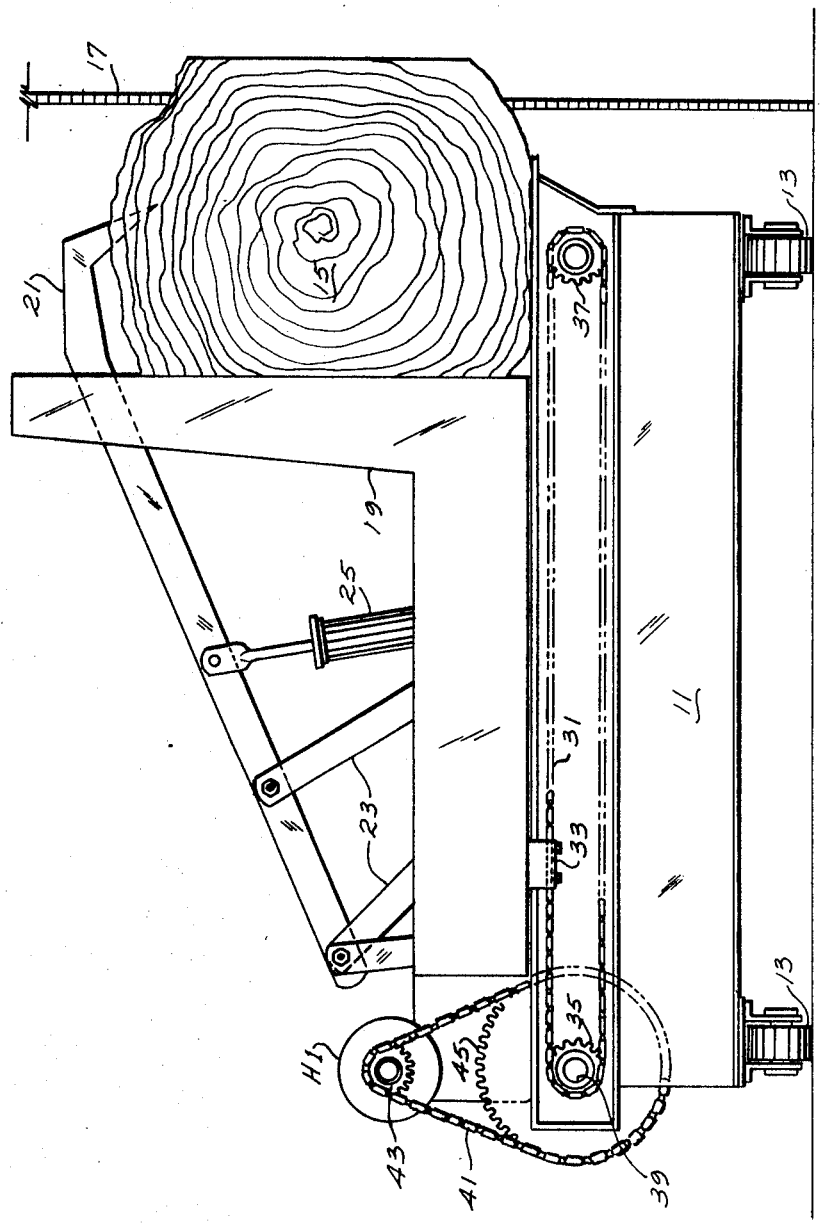
FIG. 1 is an end view of a sawmill carriage provided with incremental feed apparatus of the present invention.

Referring now to FIG. 1, there is indicated generally at 11 a sawmill carriage which is adapted to be repetitively driven longitudinally on wheels 13. Carriage 11 is operative to feed a log, as indicated at 15, longitudinally into a sawmill blade 17 which may, as illustrated, be of the band-saw type. Carriage 11 carries a series of generally L-shaped knee members 19, one in back of the other as viewed in FIG. 1, each of which is provided with at least one dog 21 for holding the log 15 against the knee member. The dogs 21 are mounted on linkage mechanisms 23 (details of which are not critical so far as the present invention is concerned) providing a straight up-and-down movement of the point of the dog and are actuated by means of hydraulic cylinders 25.

The knee members 19 are mounted for sliding movement laterally of the carriage 11 so as to feed the workpiece, e.g., the log 15, transversely of the carriage so that successive cuts may be made therein. Each knee member is adapted to be driven laterally with respect to carriage 11 by means of a roller chain 31 to which the knee member is attached as at 33. Chain 31 passes over a drive sprocket 35 and an idler sprocket 37. The drive sprockets 35 for the several knee members 19 are mounted on a common shaft 39 which is driven by a positive displacement rotary hydraulic motor H1. Motor H1 is coupled to shaft 39 through a roller chain 41 and speed reduction sprockets 43 and 45. Thus it can be seen that the knee members 19 may be driven laterally by operation of the hydraulic motor H1 to advance the workpiece for successive cuts.

Figure 2:
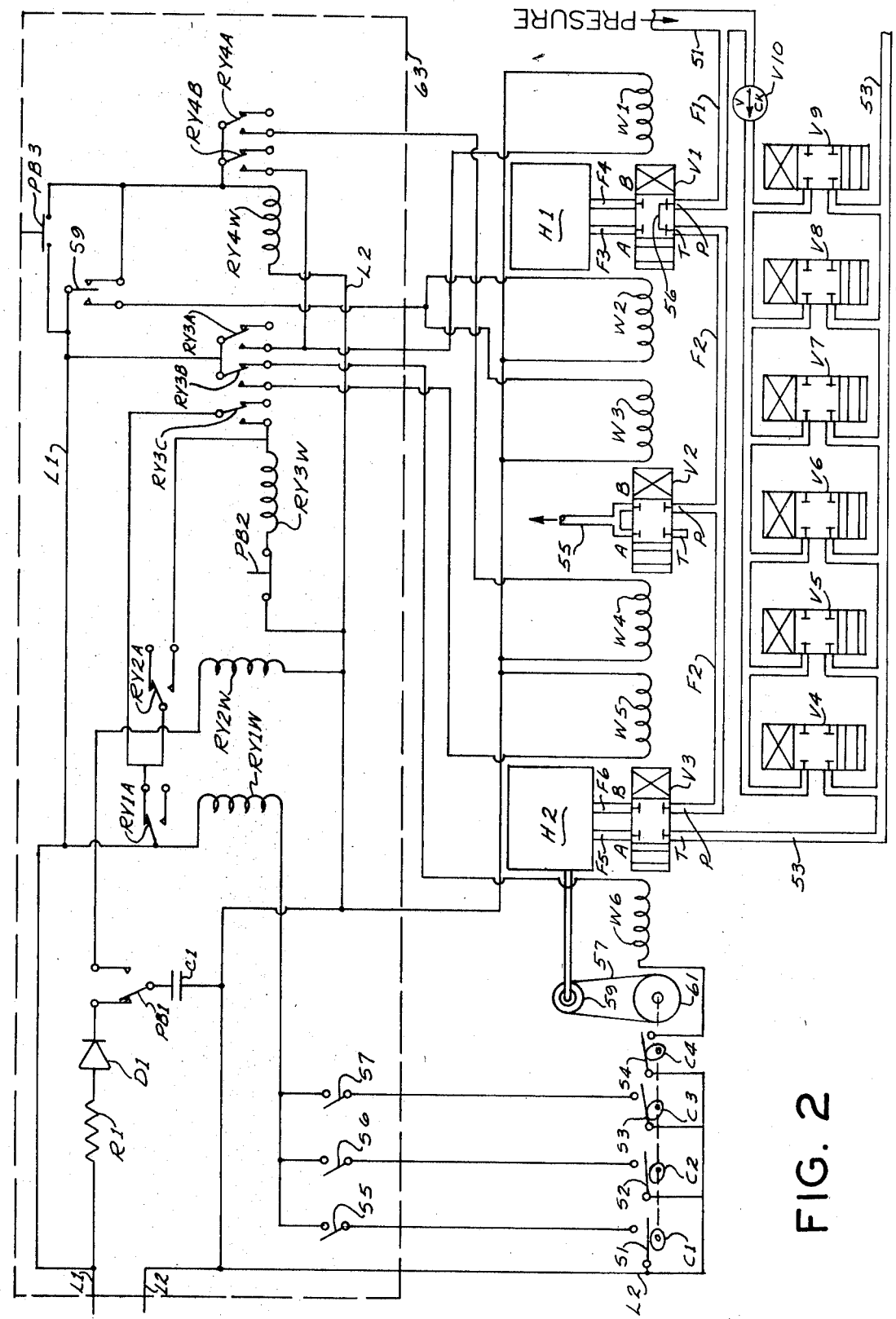
FIG. 2 is a schematic electrical and hydraulic circuit diagram of feed apparatus of this invention.

Referring now to FIG. 2, a source of hydraulic pressure, which may for example comprise a pressure regulated hydraulic pump, is connected to supply hydraulic fluid under substantially constant pressure to a supply pipe 51, fluid being returned to the source, e.g. the pump reservoir, through return lines 53 and 55 as indicated on the drawing. Hydraulic motor H1 and a second positive displacement hydraulic motor H2 are interconnected with the fluid pressure source via a hydraulic circuit including a plurality of electrically operated control valves, V1, V2 and V3. Valve V1 includes a pair of operating windings W1 and W2, valve V2 includes a pair of operating windings W3 and W4, and valve V3 includes a pair of operating windings W5 and W6. Each of the valves, as shown in FIG. 2, has four ports A, B, T and P. Each valve is of a well-known type in which its ports P and B are connected and its ports A and T are connected (for forward drive) when its right-hand winding is energized, and in which its ports P and A are connected and its ports B and T are connected (for reverse drive) when its left-hand winding is energized. As to each of the valves V2 and V3, all four ports are blocked when both windings are deenergized (i.e., when the valve is in neutral posiiton). Valve V1, however, is of the by-pass or series type, its ports P and T being interconnected when both its windings are deenergized, the bypass being indicated at 56 in FIG. 2. The fluid pressure source 51 is connected to port P of valve V1 by a fluid pressure line F1, and port T of valve V1 is connected to ports P of valves V2 and V3 by a line F2. Ports A and B of valve V1 are connected to the hydraulic motor H1 by lines F3 and F4. Ports A and B of valve V2 are connected to return line 55, and port T of valve V2 is blocked as indicated in FIG. 2. Ports A and B of valve V3 are connected to the hydraulic motor H2 by lines F5 and F6, and port T of valve V3 is connected to return line 53. Various other control valves V4–V9 may also be connected across the pressure source, e.g. through a check valve V10, for providing hydraulic motive force to other carriage components such as the cylinders 25 which operate the dogs 21.

Hydraulic motor H2, operating through a speed reduction mechanism comprising a chain 57 passing over sprockets 59 and 61, drives a camshaft carrying a series of cams C1–4. Each of the cams C1–C4 controls a respective switch S1–S4 to provide operation thereof at a respective point in the operation of the motor H2. The switches S1, S2 and S3 are closed at points corresponding to different amounts or increments of advance of the workpiece while the switch S4 is opened at the point of operation corresponding to the home or starting position of the motor H2. Selection of the amount or increment of advance, i.e., the width of cut, is made by closing a respective one of a group of selector switches S5–S7 which are connected in series with respective ones of the switches S1–S3. As will be apparent, as many cams and switches may be provided as is necessary to give the desired number and variety of possible cut widths.

The switches S1–S7 and the valve operating windings W1–W6 are interconnected in a control circuit, designated generally at 63, which comprises four relays each of which includes a respective operating winding RY1W–RY4W and corresponding contacts, e.g., RY3A–RY3C. Relay winding RY1W is of the D.C. type while relay windings RY2W–RY4W are of the A.C. type.

A.C. power is provided to the control circuit through a pair of supply leads L1 and L2. A storage capacitor C1 is normally charged through a circuit comprising a diode D1, a current limiting resistor R1 and the normally closed side of a double-throw push-button switch PB1. Capacitor C1 can be discharged through relay winding RY2W by operating the switch PB1 to the position opposite that shown. A normally closed push-button switch PB2 is connected in series with relay winding RY3W to provide emergency stop operation as is described hereinafter. As is also described hereinafter, relay winding RY4W is interconnected with a manually-operable double-throw center-off switch S9 which permits manual operation of the feed mechanism and a normally open push-button switch PB3 which is connected to provide a momentary energization or jogging operation.

The operation of the control is substantially as follows, it being initially assumed that the hydraulic motor H2 is in its normal or home position and that the motor H1 has previously been operated to retract the knee 19 so that the apparatus is in a condition to begin automatic feed operation. By closing a respective one of the selector switches S5–S7, a selected one of the switches S1–S3, e.g. switch S2, is made operative to control the extent of the workpiece advance. An advancing phase of operation is initiated by operating the push-button switch PB1 which discharges the capacitor C1 through the relay winding RY2W. Momentary energzation of this winding closes the relay contacts RY2A which in turn energize the relay winding RY3W. The resultant closing of contacts RY3C sets up a holding circuit for winding RY3W so that this relay remains energized even though the relay RY2W becomes deenergized after capacitor C1 is discharged.

The energization of relay winding RY3W also causes the contacts RY3B to energize winding W5 and the contacts RY3A to energize winding W1. Accordingly, the valves V1 and V3 are operated to connect the hydraulic motors H1 and H2 in series across the hydraulic pressure source for concurrent operation. Since both motors are of the positive displacement type, the operation of the second motor H2 will be directly and precisely proportional to the operation of the first motor H1. After the motor H1, operating through the chain driven knee member 19, has advanced the workpiece by the preselected increment, the corresponding switch, e.g., switch S2, is closed (by cam C2) thereby energizing the relay winding RY1W. The operation of contacts RY1A breaks the holding circuit to relay winding RY3W thereby causing this relay to be deenergized and the release of contacts RY3A and RY3B causes the valve windings W1 and W5 to be also deenergized, thereby terminating this first or advancing phase of operation. Accordingly the advancing movement of the workpiece is halted. Due to the incompressible nature of hydraulic fluid, there is substantially no overrun of the workpiece beyond the desired position and thus a very precisely determined increment of advance is smoothly obtained without employing clutches, ratchets or the like.

As the movement of the motor H2 away from its home position closes the switch S4, the return of the contacts RY3B to their normal position causes the winding W6 to be energized. Energization of this winding reverses valve V3 and causes motor H2 to operate in a reverse direction. Fluid flow for providing this reverse operation is available to motor H2 since the valve V1 includes by-pass 56, as noted previously. Motor H1 remains out of operation. Motor H2 operates in the reverse direction until it reaches its home position at which point switch S4 is opened by the cam C4 thereby deenergizing winding W6 and neutralizing valve V3 to cut off hydraulic motor H2 from the fluid pressure source. Once motor H2 has reached its home position, the workpiece can be advanced by another increment by again operating the push-button switch PB1. Since the extent of the advance will be determined by the operation of the same switch, e.g., S2, which determined the previous advance, it will be seen that successive increments of advance will be quite precisely equal to one another and that therefore great reproducibility of result is provided.

Since relay winding RY2W is energized only momentarily by the charge stored in capacitor C1 and since the capacitor C1 can only be recharged when the push-button PB1 is released, it can be seen that only one increment of advance will be obtained for each operation of switch PB1 no matter how long the switch is held down. Further, since the momentary energization of relay winding RY2W sets up a holding circuit for relay winding RY3W, it can be seen that a full increment of advance will be obtained even though the switch PB1 is released before the advancing movement is completed.

Reverse movement of the feed may be obtained by operating the switch S9 to the left as seen in the drawings. This will energize windings W2 and W3. Energizing winding W2 reverses the fluid circuit connection of the motor H1 with respect to the hydraulic pressure source while the energization of winding W3 of valve V2 opens its port P to its port B to provide a bypass path around motor H2 so that fluid can flow to operate motor H1 without operating the motor H2. Similarly, forward motion of the feed under manual control can be provided by moving the switch S9 to the right. This energizes relay winding RY4W so that the contacts RY4B energize the winding W1 which connects motor H1 to the hydraulic pressure source for forward motion and the contacts RY4A energize winding W4 to provide a return fluid flow path through the valve V2 (via its ports P and A). This side of switch S9 is shunted by the push-button switch PB3 to provide a convenient method of "jogging" the feed to produce very small amounts of advancement of the workpiece.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for advancing a workpiece by a predetermined increment, said apparatus comprising:
   a first positive displacement hydraulic motor;
   means driven by said first hydraulic motor for advancing said workpiece;
   a second positive displacement hydraulic motor;
   fluid circuit means including valve means for selectively interconnecting said first and second hydraulic motors with a fluid pressure source;
   means for selectively initiating a phase of operation in which said valve means are operated to connect said first and second hydraulic motors in series across said fluid pressure source for concurrent operation, the operation of said second motor being thereby directly proportional to the operation of said first motor; and
   means driven by said second motor for terminating said phase of operation when the operation of said second motor reaches a preselected limit whereby said workpiece is advanced by a precisely controlled increment.

2. Apparatus as set forth in claim 1 including means for providing a second phase of operation in which said valve means is operated to reverse the operation of said second motor without operating said first motor thereby to return said means driven by said second motor to its original position preparatory to advancing said workpiece by another increment.

3. Apparatus as set forth in claim 1 wherein said first and second motors are rotary hydraulic motors.

4. Apparatus as set forth in claim 1 wherein said valve means includes a bypass valve for said first motor whereby said second motor can be operated without operating said first motor.

5. Apparatus as set forth in claim 1 wherein said valve means includes a valve for bypassing said second motor whereby said first motor can be operated without operating said second motor.

6. Apparatus as set forth in claim 1 wherein said means for selectively initiating said first phase of operation comprises a relay and means for selectively discharging a capacitor through the operating winding of said relay to provide momentary energization thereof.

7. Apparatus as set forth in claim 1 wherein said means for initiating said first phase of operation comprises a relay and means providing a holding circuit for said relay and wherein said means for terminating said first phase of operation includes a switch which is operated by said second motor to break said holding circuit when the operation of said second motor reaches said preselected limit.

8. Apparatus as set forth in claim 1 wherein said means for terminating said phase of operation includes a plurality of limit switches and means for operating said limit switches successively as the operation of said second motor proceeds and includes also selector switch means for selecting which one of said limit switches terminates said phase of operation.

9. Apparatus as set forth in claim 1 wherein said means for operating said limit switches successively comprises a series of cams driven by said second motor.

10. Apparatus for advancing a workpiece by predetermined increments, said apparatus comprising:
    a first positive displacement hydraulic motor;
    means driven by said first hydraulic motor for advancing said workpiece;
    a second positive displacement hydraulic motor;
    fluid circuit means including valve means for selectively interconnecting said first and second hydraulic motors with a fluid pressure source;
    means for selectively initiating a first phase of operation in which said valve means are operated to connect said first and second hydraulic motors in series across said fluid pressure source for concurrent operation, the operation of said second motor being thereby directly proportional to the operation of said first motor;
    means driven by said second motor for terminating said first phase of operation when the operation of said second motor reaches a preselected limit; and
    means for providing a second phase of operation following said first phase during which said valve means are operated to return said second motor to its starting point independently of said first motor whereby said workpiece is advanced by precisely equal increments upon successive repetitions of said phases of operation.

11. Apparatus for advancing a workpiece by predetermined increments, said apparatus comprising:
    a first positive displacement hydraulic motor;
    means driven by said first hydraulic motor for advancing said workpiece;
    a second positive displacement hydraulic motor;
    fluid circuit means including electrically operated valve means for selectively interconnecting said first and second hydraulic motors with a fluid pressure source;
    means including a plurality of relays for selectively energizing said valve means;
    means for discharging a capacitor through the operating winding of one of said relays for initiating a first phase of operation in which said valve means are operated to connect said first and second hydraulic motors in series across said fluid pressure source for concurrent operation, the operation of said second motor being thereby directly proportional to the operation of said first motor;
    means providing a holding circuit for continuing said first phase of operation after said capacitor is discharged;
    means driven by said second motor for breaking said holding circuit for terminating said first phase of operation when the operation of said second motor reaches a preselected limit; and
    means for automatically initiating a second phase of operation following said first phase during which said valve means are operated to return said second motor to its starting point independently of said first motor whereby said workpiece is advanced by precisely equal increments upon successive repetitions of said phases of operation.

12. Apparatus as set forth in claim 11 wherein the means driven by the second motor comprises a series of cams and limit switches actuated by the cams, the cams being adapted to actuate the limit switches at points corresponding to different increments of workpiece advance, and further comprising selector switches for selecting which one of said limit switches terminates said first phase of operation.

References Cited

UNITED STATES PATENTS

| | | | |
|---|---|---|---|
| 2,112,466 | 3/1938 | Maloon. | |
| 3,214,901 | 11/1965 | Iverson | 91—411 XR |
| 3,348,624 | 10/1967 | Just et al. | 60—53 XR |

EDGAR W. GEOGHEGAN, Primary Examiner

U.S. Cl. X.R.

60—53; 91—58, 411